May 22, 1962 J. R. BENFORD 3,035,486
ILLUMINATING MEANS FOR OPAQUE MATERIALS
Filed May 4, 1959
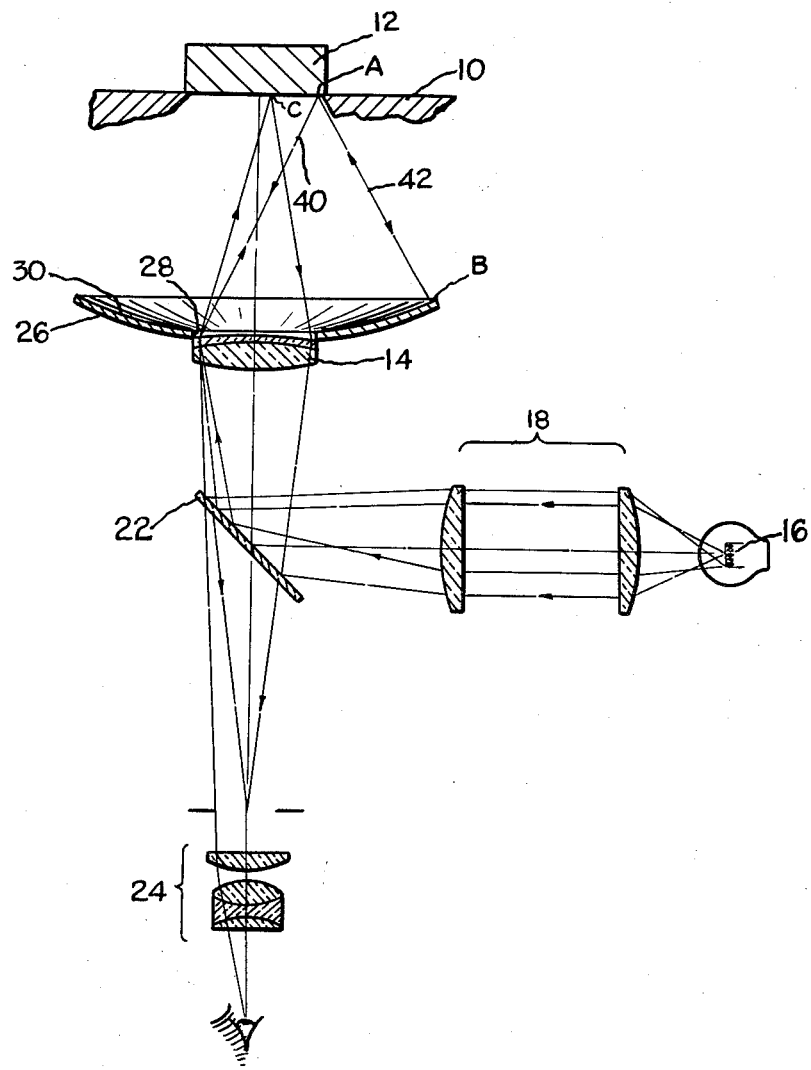
INVENTOR.
JAMES R. BENFORD
BY Frank C. Parker
B. A. Chioma
ATTORNEYS United States Patent Office 3,035,486
Patented May 22, 1962

3,035,486
ILLUMINATING MEANS FOR OPAQUE MATERIALS
James R. Benford, Irondequoit, N.Y., assignor to Bausch & Lomb Incorporated, a corporation of New York
Filed May 4, 1959, Ser. No. 810,816
3 Claims. (Cl. 88—40)

This invention relates to illuminating means and, more particularly, to an illuminator for use with a metallurgical microscope.

In the illumination of opaque objects, it is desirable that the outer portions of the field of view be as sufficiently illuminated as the center portion surrounding the optical axis of the microscope. Various arrangements are in use which are suitable for illuminating the field of view for opaque specimens but these require unique light sources that are costly and, in most cases, require special modifications of the microscope for installation.

The object of the present invention is to provide an illuminator for a microscope which will insure even illumination of all portions of the specimen under study.

Another object of the invention is to provide a relatively simple and inexpensive illuminating means which may be easily arranged on conventional metallurgical microscopes.

Other objects and advantages of the present invention will become apparent from the following description when taken with the accompanying drawing wherein there is illustrated a schematic representation of the present invention as applied to a microscope.

In the drawing, there is illustrated a stage 10 upon which rests an opaque specimen 12 having a surface to be studied. The specimen is observed with the aid of an objective 14 of a metallurgical microscope located under the stage. The microscope also includes a source of horizontal illumination comprising a lamp 16 and a condenser lens 18. Light from the lamp 16 passes through the condenser lens and is directed by a semi-transparent mirror 22 through the objective 14 and onto the specimen 12 in the conventional manner. The image of the illuminated specimen is observed by means of a conventional eyepiece 24.

In order to evenly illuminate all regions of the specimen, the illumination system outlined above includes an annular mirror 26 having its major axis coincident with the axis of the objective 14. The central portion of the mirror 26 is formed with an aperture 28 of approximately the same diameter as the objective 14 in order that the mirror may be positioned so as to surround the objective while still permitting unobstructed viewing through the objective. The reflecting surface 30 of the mirror faces the specimen 12 and is of aspheric form, preferably toric.

The toric surface 30 may be described as being the surface of revolution generated by an arc of a circle having a radius approximately equal to the object distance of the microscope when the circle is rotated about the optical axis of the microscope with its center spaced from the axis a distance approximately equal to the radius of the microscope field. Thus, the centers of curvature of any cross-section of the surface 30 lie near the respective, corresponding opposite ends of the cross-section of the microscope field, and the locus of the centers of curvature of all the possible cross-sections is a circle along the outer edge of the field of view.

The effect of the mirror 30 having the specified curvature may be described in connection with a typical ray as illustrated in the drawing. The ray, denoted by the reference numeral 40, is typical of rays of light emerging from the objective 14 and produced by the source 16. The ray 40 is directed to the point A on the specimen and is reflected therefrom. Normally, this light is lost as the same is not redirected into the objective and, consequently, the point A would not be illuminated as viewed through the eyepiece of the microscope. With the provision of the mirror 26, the reflected ray 42 of the ray 40 impinges upon the surface 30 at B and is redirected back onto the specimen at point A and thence back into the objective. In this manner, the illumination of the outer portions of the field of view is improved. It will be apparent that not all discrete points on the specimen that lie along a line radially extending from the center point thereof will be as perfectly affected as the ray 40. However, good results are attainable if the center of curvature of the surface 30, when viewed in a plane, is located somewhere between the outermost point on the specimen beyond the point A and the farthermost point upon which impinging rays from the objective are possible such as at point C. Theoretically, a circle of reflected light would develop as the locus of all the centers of curvature of the surface 30, however, diffusion of the light as the same is reflected from the surface of specimen 12 and surface 30 eliminates any sharp contrast in this cyclic effect. The outer portions of the specimen thereby become evenly illuminated with light loss held to a minimum.

From the foregoing, it is apparent that the objects of the invention have been attained and that there is provided a simple and inexpensive illuminating means which may be easily arranged upon a conventional microscope which will insure illumination of all portions of the specimen under study.

I claim:

1. An illuminator for a microscope comprising an annular mirror surrounding the objective thereof and having its reflecting surface facing a specimen under study, said reflecting surface conforming to a toroidal surface generated by the revolution of an arc of a circle about the optical axis of the microscope as the center of rotation with its center of curvature spaced therefrom, said arc having a radius approximately equal to the object distance of the microscope.

2. In a microscope having an objective, and optical means operatively arranged to direct light rays from a light source through said objective for illuminating the specimen, the combination comprising an annular mirror surrounding the objective and having its reflecting surface facing the specimen, said surface being substantially toric in form and having its center of revolution on the optical axis of the microscope and having its center of curvature spaced from said axis and located approximately in the focal plane of the microscope.

3. In a microscope having an objective, and optical means operatively arranged to direct light rays from a light source through said objective for illuminating a specimen, the combination comprising an annular mirror surrounding the objective and having its reflecting surface facing the specimen, said surface conforming to a toroidal surface generated by the revolution of an arc of a circle about the optical axis of the microscope as the center of rotation with its center of curvature spaced therefrom a distance approximately equal to the radius of the field of view, said arc having a radius approximately equal to the object distance of the microscope.

References Cited in the file of this patent

UNITED STATES PATENTS

| 1,927,854 | Straubel | Sept. 26, 1933 |
| 1,985,072 | Bauersfeld | Dec. 18, 1934 |
| 2,930,287 | Franks | Mar. 29, 1960 |

FOREIGN PATENTS

| 249,163 | Switzerland | Mar. 16, 1948 |
| 427,049 | Germany | Mar. 24, 1926 |
| 720,900 | Germany | May 19, 1942 |